United States Patent [19]

Ishikawa

[11] Patent Number: 4,858,158

[45] Date of Patent: Aug. 15, 1989

[54] APPARATUS AND METHOD FOR CONVERTING ROTATION ANGLE WIDTH INTO TIME WIDTH

[75] Inventor: Masataka Ishikawa, Higashimatsuyama, Japan

[73] Assignee: Diesel Kiki Co., Ltd., Tokyo, Japan

[21] Appl. No.: 135,441

[22] Filed: Dec. 21, 1987

[30] Foreign Application Priority Data

Dec. 22, 1986 [JP] Japan .................. 61-306143

[51] Int. Cl.$^4$ .................. G06F 15/46; G01B 7/00
[52] U.S. Cl. .................. 364/571.01; 123/436; 123/414; 324/208; 341/116; 364/431.05
[58] Field of Search .................. 364/431.05, 571.01, 364/431.08, 569; 123/414, 476, 436, 419; 324/208; 74/860; 341/116, 167; 73/119 A, 1 E

[56] References Cited

U.S. PATENT DOCUMENTS

| | | | |
|---|---|---|---|
| 4,377,998 | 3/1983 | Härtel et al. .................. | 123/419 |
| 4,378,695 | 4/1983 | Oshizawa .................. | 73/119 A |
| 4,461,257 | 7/1984 | Hosaka et al. .................. | 123/436 |
| 4,519,362 | 5/1985 | Arakawa et al. .................. | 123/414 |
| 4,553,208 | 11/1985 | Akiyama et al. .................. | 364/431.05 |
| 4,582,033 | 4/1986 | Sorg et al. .................. | 123/436 |
| 4,617,899 | 10/1986 | Nakajima .................. | 364/431.05 |
| 4,626,621 | 12/1986 | Hiyama et al. .................. | 341/116 |
| 4,667,634 | 5/1987 | Matsumura et al. .................. | 123/436 |
| 4,723,520 | 2/1988 | Suzuki et al. .................. | 123/414 |
| 4,754,220 | 6/1988 | Shimizu .................. | 324/208 |
| 4,766,863 | 8/1988 | Fujimori .................. | 123/436 |

*Primary Examiner*—Felix D. Gruber
*Assistant Examiner*—Christopher L. Makay
*Attorney, Agent, or Firm*—Birch, Stewart, Kolasch & Birch

[57] ABSTRACT

A set rotation angle width related to a rotary machine, of which the rotation speed varies cyclically, is converted to a time width required for the rotary machine to rotate by the set rotation angle width from a given rotation angle position. The converted time width is corrected by a correcting coefficient so that the time width is not affected by the rotation variation of the rotary machine. The correcting coefficient is decided based on the rotation angle position and the rotation speed variation of the rotary machine related to the set rotation angle width from the rotation angle position, and by the correcting coefficient, correction is done so that an actual rotation angle width corresponding to the converted time width becomes the set rotation angle width.

15 Claims, 7 Drawing Sheets

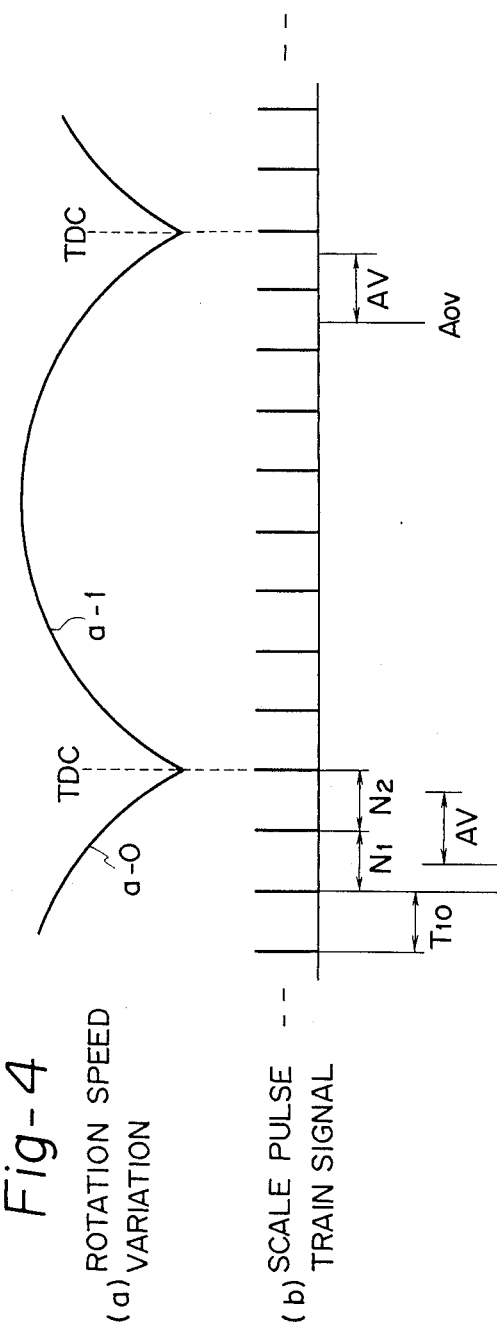
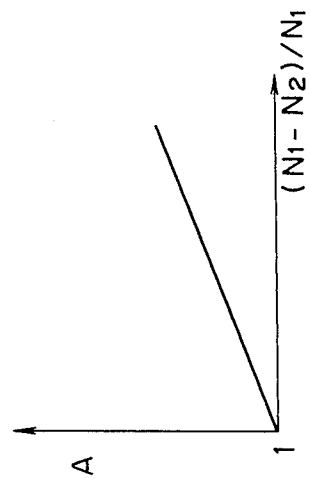
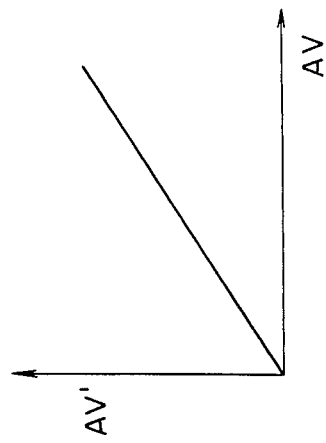

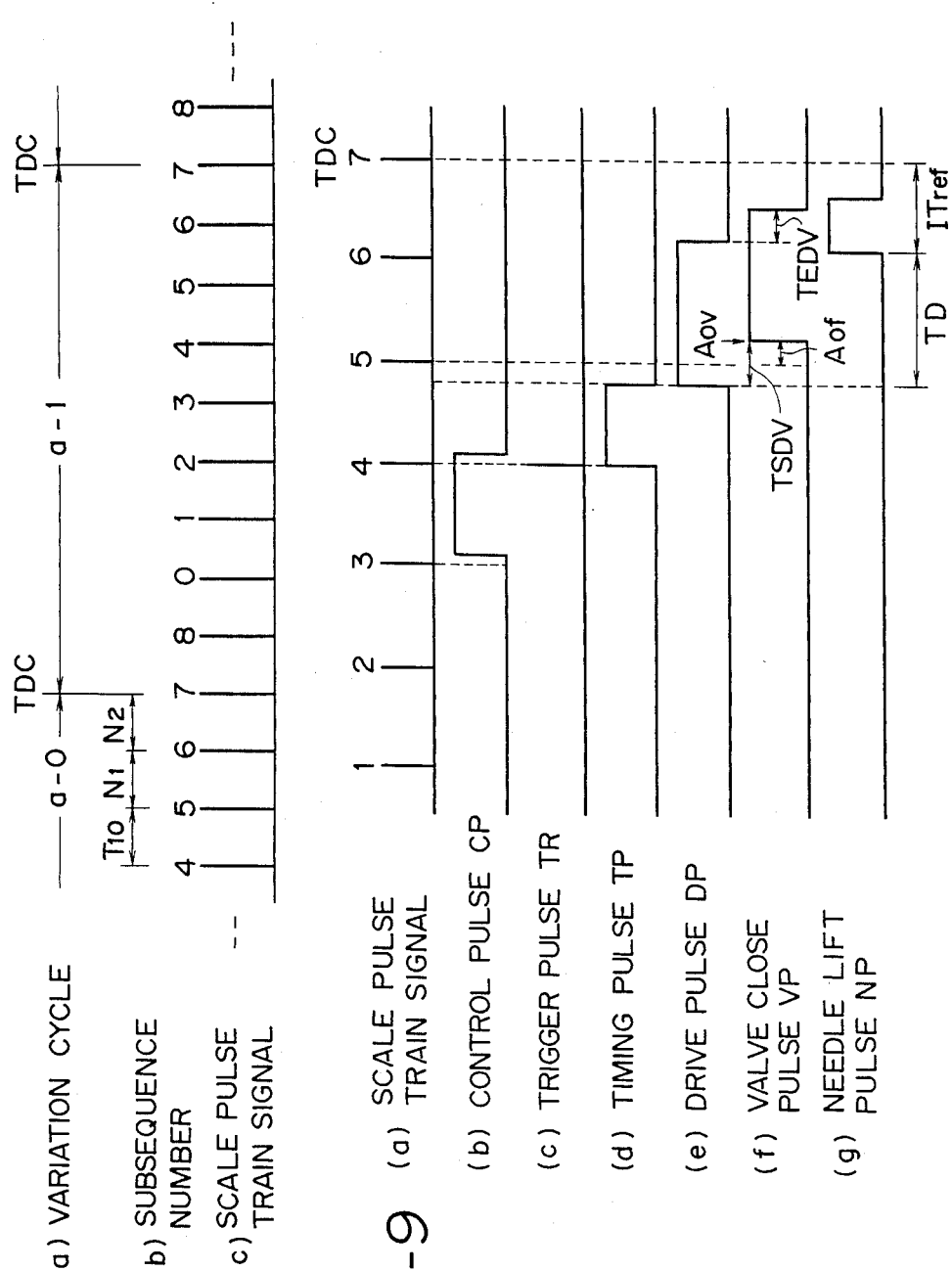

APPARATUS AND METHOD FOR CONVERTING ROTATION ANGLE WIDTH INTO TIME WIDTH

BACKGROUND OF THE INVENTION

The present invention relates to apparatus and method for converting the information of rotation angle width into the information of time width required for a rotary machine to rotate for that rotation angle width, and is applicable effectively for example for fuel injection control system for controlling supply of fuel from a fuel injection pump to a diesel engine by means of the time control of an electromagnetic valve.

In a conventional system for controlling the supply of fuel from a fuel injection pump to a diesel engine by means of an electromagnetic valve, using a time $T_{10}$ required for the fuel injection pump to rotate a unit rotation angle of 10°, a rotation angle width $X_A$ corresponding to a set injection quantity is converted into a time width $T_X$ by $T_X = T_{10} \cdot X_A/10$, and the electromagnetic valve is time-controlled by this time width $T_X$. However, in the conventional system, since the engine's rotation speed varies by combustion of each cylinder, there is a problem that an error occurs between the rotation angle width $X_A$ and an actual rotation angle width corresponding to the time width $T_X$.

FIG. 1 is an explanatory drawing for explaining conversion from rotation angle width to time width in the conventional system. A waveform (A) shows the rotation speed variation of an engine, and a signal (B) shows a scale pulse train signal having a scale pulse given for each unit rotation angle of 10°. The rotation angle width $X_A$ is converted to the time width $T_X$ by the above-mentioned formula by using a time $T_{10}$ of a pulse spacing $S_{10}$ of the scale pulse train signal. Since the rotation speed drops, the actual rotation angle width for the time width $T_X$ from a rotation angle position $P_X$ is smaller than the rotation angle width $X_A$. Therefore, a set injection quantity corresponding to the rotation angle width $X_A$ is not given.

This problem occurs not only in the case of above-mentioned fuel injection control system but similarly in the case of converting the information of rotation angle width into the information of time width required for a rotary machine to rotate by the rotation angle width from a given set rotation angle position.

SUMMARY OF THE INVENTION

It is an object of the present invention to provide an improved apparatus and method for converting a rotation angle width into a time width.

Another object of the present invention is to provide an apparatus which is capable of correcting a conversion error due to the rotation speed variation of a rotary machine.

Still another object of the present invention is to provide a method which is capable of correcting a conversion error due to the rotation speed variation of a rotary machine.

The above and other objects are attained by an apparatus for converting a set rotation angle width related to a rotary machine, of which the rotation speed varies cyclically, into a time width required for said rotary machine to rotate by said set rotation angle width from a given rotation angle position, comprising; scale pulse train signal generating means for generating a scale pulse train signal having a scale pulse given whenever said rotary machine rotates a predetermined unit rotation angle; reference pulse train signal generating means for generating a reference pulse train signal having a reference pulse for identifying each scale pulse of said scale pulse train signal; converting means, responsive to said scale pulse train signal, said reference pulse train signal and said set rotation angle width, for detecting a spacing time of a predetermined scale pulse, based on identification by said reference pulse train signal, of each scale pulse of said scale pulse train signal, for converting said set rotation angle width into a time width by using the detected spacing time and said unit rotation angle, and for giving the converted time width; operating means, responsive to said scale pulse train signal and said reference pulse train signal, for detecting, based on said identification by said reference pulse train signal of each scale pulse of said scale pulse train signal, each respective spacing time of a plurality of scale pulses predetermined in relation to said given rotation angle position and said set rotation angle width, computing a rotation speed variation value of said rotary machine based on each detected spacing time, and for giving the computed rotation speed variation value; and correcting means, responsive to the time width from said converting means, the rotation speed variation value from said operating means and said given rotation angle position, for computing, based on said rotation speed variation value and said given rotation angle position, a correcting coefficient for correcting an error between said set rotation angle width and an actual rotation angle width corresponding to said time width, correcting said time width by using said correcting coefficient, and for giving the corrected time width.

The above and other objects are also attained by a method for converting a set rotation angle width related to a rotary machine, of which rotation speed varies cyclically, into a time width required for said rotary machine to rotate by said set rotation angle width from a given rotation angle position, comprising the steps of; receiving a scale pulse train signal having a scale pulse given whenever said rotary machine rotates by a predetermined unit rotation angle and a reference pulse train signal having a reference pulse for identifying each scale pulse of said scale pulse train signal; identifying each scale pulse of said scale pulse train signal by means of the reference pulse of said reference pulse train signal; detecting, when a first scale pulse of said scale pulse train signal is given, a spacing time of a predetermined scale pulse of said scale pulse train signal by responding to said scale pulse signal and said identification; detecting, when a second scale pulse of said scale pulse train signal is given, a spacing time of a scale pulse of said scale pulse train signal predetermined in relation to said given rotation angle position and said set rotation angle width, by responding to said scale pulse train signal and said identification, and determining a first unit rotation speed based on the spacing time detected; detecting, when a third scale pulse of said scale pulse train signal is given, a spacing time of another scale pulse of said scale pulse train signal predetermined in relation to said given rotation angle position and said set rotation angle width, by responding to said scale pulse train signal and said identification, and determining a second unit rotation speed based on the spacing time detected; computing a rotation speed variation value of said rotary machine by responding to said first and second unit rotation speeds and by using said first and second unit rotation speeds; computing, when a fourth scale pulse of said scale pulse train signal is given, a correcting coefficient by responding to said scale pulse train signal, said identification, said rotation speed variation value and said given rotation angle position, based on said rotation speed variation value and said given rotation angle position; and outputting a corrected time width, by responding to said spacing time, said unit rotation angle, said set rotation angle width and said correcting coefficient, by using said spacing time, said unit rotation angle, said set rotation angle width and said correcting coefficient.

BRIEF DESCRIPTION OF THE DRAWINGS

The foregoing and other objects, features and attendant advantages of the present invention will be appreciated as the same become better understood by means of the following description and accompanying drawings wherein;

FIG. 4 is an explanatory drawing for describing a method of obtaining correcting coefficient, FIG. 5 (A) is an explanatory drawing for describing the relationship between a given valve close angle width and an actual valve close angle width caused by rotation speed variation, FIG. 5 (B) is a relation drawing of correcting coefficient and rotation speed variation, FIG. 5 (C) is a relation drawing of a factor $K_1$ and an offset angle, FIG. 6 (A), FIG. 6 (B) and FIG. 6 (C), and FIG. 7 are flow diagrams of a microcomputer of FIG. 3, FIG. 8 is an explanatory drawing for describing operation of a microcomputer of FIG. 3, and FIG. 9 is an explanatory drawing for describing operation of a conversion apparatus of FIG. 3.

DETAILED DESCRIPTION OF THE INVENTION

Figure 1:
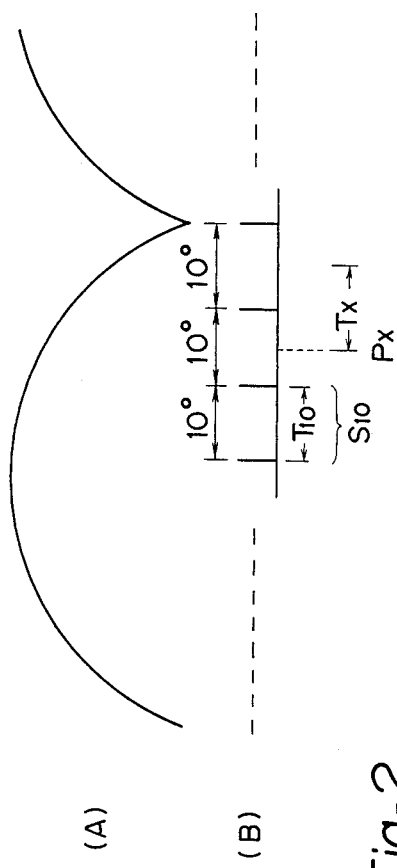
FIG. 1 is an explanatory drawing for describing converting from a rotation angle width to a time width according to a prior system.
Figure 2:
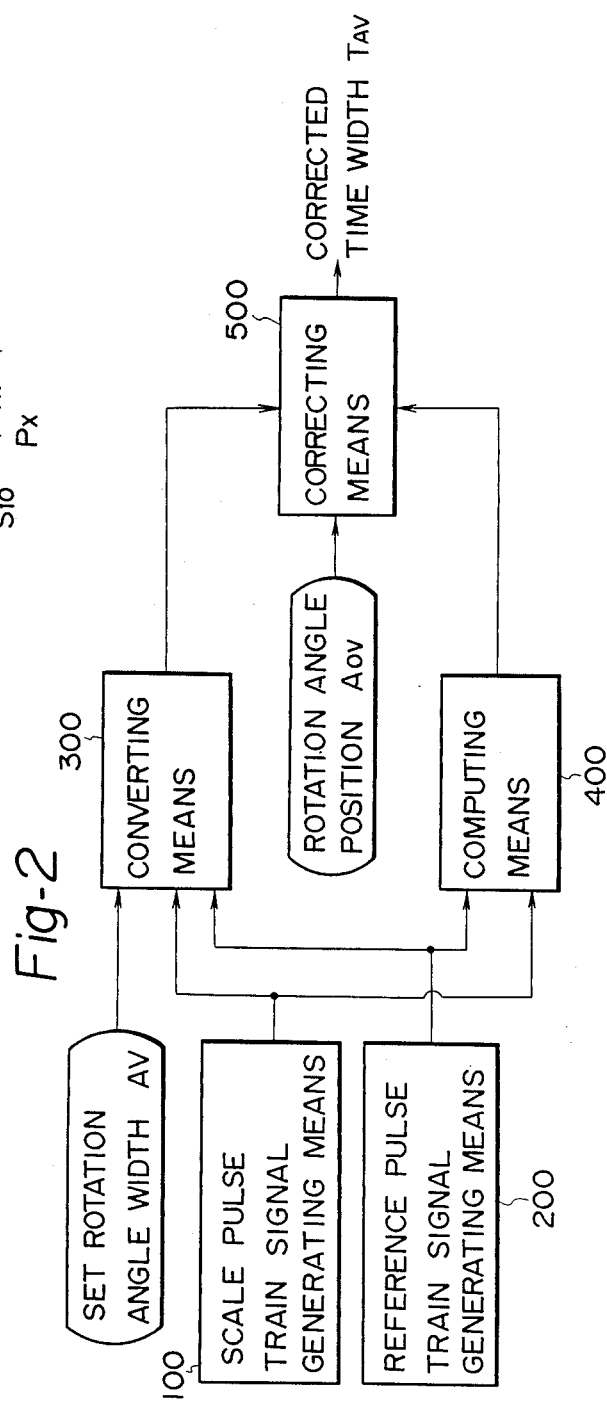
FIG. 2 is a block diagram showing a fundamental embodiment of a conversion apparatus according to the present invention.

In a fundamental embodiment of FIG. 2, a set rotation angle width AV is converted to a time width $T_{AV}$ required for a rotary machine to rotate from a rotation angle position $A_{OV}$ by the set rotation angle width AV. Scale pulse train signal generating means 100 give converting means 300 and operation means 400 a scale pulse train signal having a scale pulse given whenever the rotary machine rotates by a unit rotation angle of 10°. Reference pulse train signal generating means 200 give the converting means 300 and operation means 400 a reference pulse train signal having a reference pulse for identifying each scale pulse of the scale pulse train signal. The converting means 300, responsive to the scale pulse train signal, the reference pulse train signal and the set rotation angle width AV, measure a spacing time $T_{10}$ of a specified scale pulse based on identification by the reference pulse train signal, convert the set rotation angle AV to a time width $T = T_{10} \times (AV/10)$ by the measured spacing time $T_{10}$ and the unit rotation angle 10°, and give the converted time width T to correcting means 500. Operation means 400, responsive to the scale pulse train signal and the reference pulse train signal, detect a plurality of scale pulses predetermined in relation to the set rotation angle width AV from the rotation angle position $A_{OV}$ based on identification, by the reference pulse train signal, of each scale pulse of the scale pulse train signal, and compute a rotation speed variation value $(N_1 - N_2)/N_1$ of the rotary machine based on the spacing time of the detected scale pulses, and give the correcting means 500 the computed rotation speed variation value $(N_1 - N_2)/N_1$. The correcting means 500, responsive to the rotation speed variation value $(N_1 - N_2)/N_1$, the time width T and the rotation angle position $A_{OV}$, determine a correcting coefficient A for correcting an error between the set rotation angle AV and an actual rotation angle width AV' responding to the time width T based on the rotation speed variation value $(N_1 - N_2)/N_1$ and the rotation angle position $A_{OV}$, correct the time width T by using the correcting coefficient A, and give a corrected time width $T_{AV} = T_{10} \times (AV/10) \times A$. The contents of the fundamental embodiment may be understood more clearly by a preferred embodiment of FIG. 3.

Figure 3:
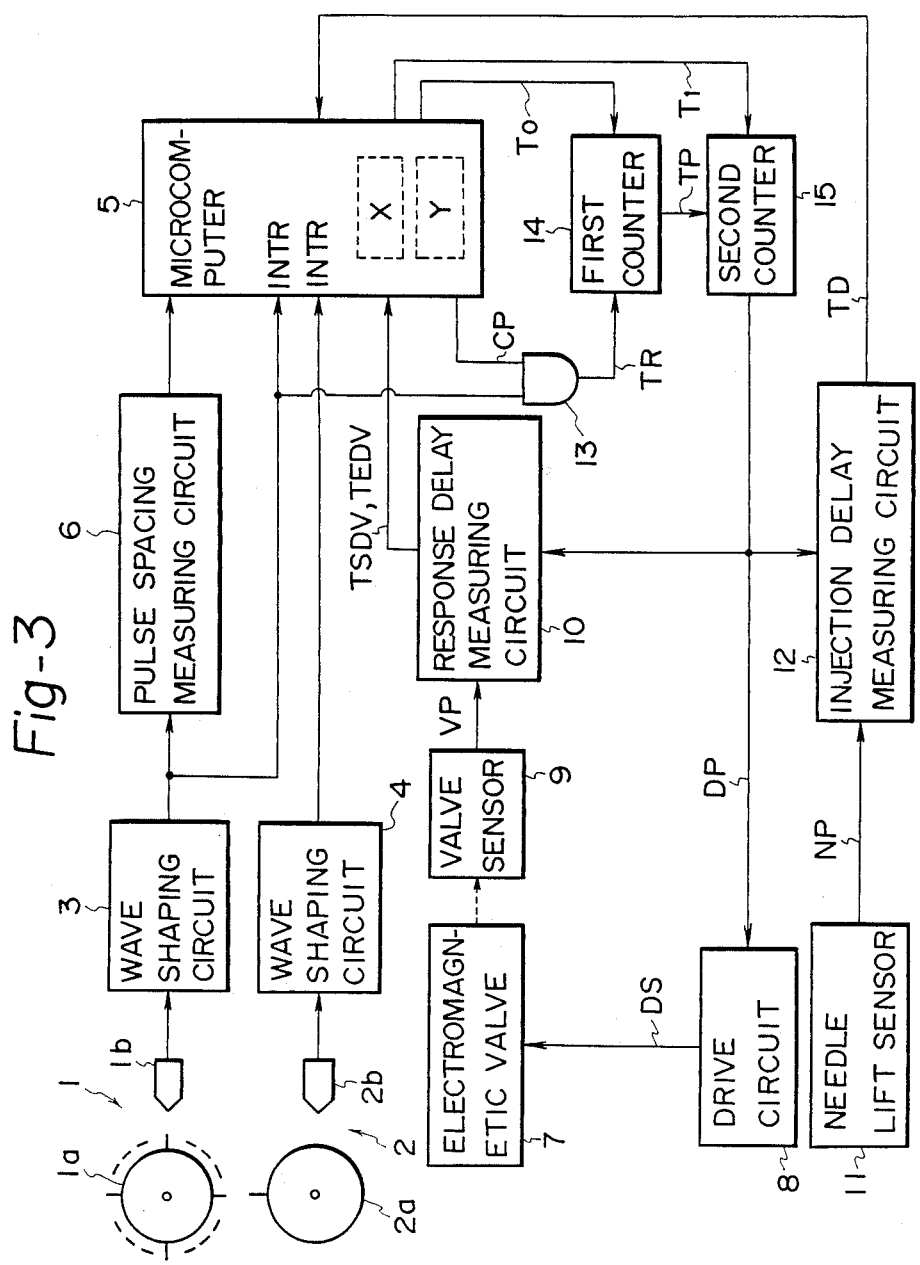
FIG. 3 is a block diagram showing a preferred embodiment of a conversion apparatus according to the present invention.

A preferred embodiment of FIG. 3 shows a conversion apparatus applied for a fuel injection control of a diesel engine.

In FIG. 3, a reference numeral 1 shows a first rotation angle sensor, and a reference numeral 2 shows a second rotation angle sensor. A pulser 1a of the first rotation angle sensor 1 provides 36 cogs formed with 10° angle spacing around its peripheral surface. A pulser 2a of the second rotation angle sensor 2 provides a single cog around its peripheral surface. The pulser 1a and the pulser 2a are fixed to a drive shaft (not shown) of a fuel injection pump, and rotate together with the drive shaft by a four-cycle four-cylinder diesel engine for rotationally driving the drive shaft. An electromagnetic pickup 1b of the first rotation angle sensor 1 is fixed near the peripheral surface of the pulser 1a and detects cogs of the pulser 1a. A detected signal of the electromagnetic pickup 1b is pulse-shaped through a wave shaping circuit 3, and thereby a scale pulse train signal is given. Each scale pulse of the scale pulse train signal is given every 10° unit rotation angle. Therefore, 36 scale pulses are given per one rotation of the drive shaft of the fuel injection pump. An electromagnetic pickup 2b of the second rotation angle sensor 2 is fixed near the peripheral surface of the pulser 2a and detects cog of the pulser 2a. A detected signal of the electromagnetic pickup 2b is pulse-shaped through a wave shaping circuit 4, and thereby a reference pulse train signal is given. Each reference pulse of the reference pulse train signal is given every one rotation of the drive shaft of the fuel injection pump. The first and second rotation angle sensors 1 and 2 are provided so that a reference pulse rise between a predetermined scale pulse and the immediately preceding scale pulse. As described in the later part, each scale pulse is identified by sequence numbers "0"-"35", with the above-mentioned predetermined scale pulse set to be "0". In the case of the present embodiment, furthermore, the first and second rotation angle sensors 1 and 2 are provided so that a scale pulse having a subsequence number "7" rise at the top dead center (TDC) of each cylinder of the diesel engine. A subsequence number is given by a remainder of division of a sequence number by a value 9. To divide each sequence number by the value 9 in order to obtain the subsequence number is because a four-cycle four-cylinder diesel engine is used. Subsequence number is "0"–"8" respectively for sequence numbers "0"–8", "9"–"17", "18"–"26" and "27"–"35".

A scale pulse train signal produced from the wave shaping circuit 3 is given to an interrupt signal to a microcomputer 5, and given to a pulse spacing measuring circuit 6 at the same time. The pulse spacing measuring circuit 6 measures a spacing time of each scale pulse of the scale pulse train signal, that is, a time required for rotating by the 10° unit rotation angle. The measured time is given to the microcomputer 5. A reference pulse train signal produced from the wave shaping circuit 4 is given to the microcomputer 5 as an interrupt signal.

A reference numeral 7 shows an electromagnetic valve. The electromagnetic valve 7 is provided in the fuel injection pump, and controls the quantity of fuel supplied from the fuel injection pump to the diesel engine. The electromagnetic valve 7 when closed allows supply of fuel from the fuel injection pump to the diesel engine. The electromagnetic valve 7 when opened shuts off supply of fuel from the fuel injection pump to the diesel engine. The electromagnetic valve 7 is closed by being excited by a drive signal DS from a drive circuit 8, and opened when the drive signal DS is not given. The drive circuit 8, by receiving a drive pulse DP given from a second counter 15, outputs the drive signal DS while the drive pulse DP is given. The reference numeral 9 shows a valve sensor for detecting the valve close period of the electromagnetic valve 7. The valve sensor 9 gives a valve close pulse VP for representing the valve close period of the electromagnetic valve 7 to a response delay measuring circuit 10. The response delay measuring circuit 10, by receiving the valve close pulse VP and the drive pulse DP from the second counter 15, measures a valve close start delay time TSDV of the electromagnetic valve 7 for representing a time period from an input of the drive pulse DP to an input of the valve close pulse VP, and a valve close end delay time TEDV of the electromagnetic valve 7 for representing a time period from an end of the drive pulse DP to an end of the valve close pulse VP. The measured delay times TSDV and TEDV are given to the microcomputer 5.

A reference numeral 11 shows a needle lift sensor. The needle lift sensor 11 detects an actual injection timing of a predetermined injection valve (not shown) of the diesel engine, and give an injection delay measuring circuit 12 a needle lift pulse NP. The injection delay measuring circuit 12, receiving the needle lift pulse NP and the drive pulse DP given from the second counter 15, measures an injection delay time TD for representing a time period from an input of the drive pulse DP to an input of needle lift pulse NP. The measured injection delay time TD is given to the microcomputer 5.

A reference numeral 13 shows an AND circuit and a reference numeral 14 shows a first counter. The AND circuit 13 inputs a scale pulse given from the wave shaping circuit 3 and a control pulse CP given from a control pulse output port of the microcomputer 5, and produces a trigger pulse TR for triggering the first counter 14. To the first counter 14, a timing time width $T_0$ is set by the microcomputer 5. The first counter 14, by being given the trigger pulse TR, gives a timing pulse with timing time width $T_0$ to the second counter 15. To the second counter 15, a valve close time width $T_1$ is set by the microcomputer 5. The second counter 15 is triggered at the falling of the timing pulse TP of the first counter 14, and outputs a drive pulse DP with the valve close time width $T_1$.

The microcomputer 5, following input informations including a scale pulse train signal, accelerator operation quantity (not shown) etc., computes a set injection quantity and a set injection timing by using well-known means. Also, the microcomputer 5 computes and outputs the control pulse CP, the timing time with $T_0$ and the valve close time width $T_1$, for giving the set injection quantity with timing matching the set injection timing. The valve close time width $T_1$ is given by a time width $T_{AV}$, obtained by converting the set valve close angle width AV, corresponding to the set injection quantity, of the electromagnetic valve 7, and by the response delay times TSDV and TEDV of the electromagnetic valve 7. The set valve close angle width AV is converted to the time width $T_{AV}$ by a formula (1) by using a time $T_{10}$ required for rotating by the unit rotation angle (10°), a correcting coefficient A and the unit rotation angle (10°).

$$T_{AV} = T_{10} \times (AV/10) \times A \tag{1}$$

The correcting coefficient A is given for correcting an error between the set valve close angle width AV and an actual valve close angle AV' corresponding to the time width $T = T_{10} \times (AV/10)$.

FIG. 4 is an explanatory drawing for explaining how to determine the correcting coefficient A. In FIG. 4, a waveform (a) shows a rotation speed variation of the engine, and a signal (b) shows the scale pulse train signal. The rotation speed variation (a) has a variation cycle in which engine speed is the lowest at the top dead center (TDC). The set valve close angle width AV is a rotation angle width from the rotation angle position $A_{OV}$ under a variation cycle a-1. The correcting coefficient A of the time width $T_{AV}$ corresponding to the set valve close angle width AV is determined by formulas (2) and (3) based on rotation speeds $N_1$ and $N_2$ and an offset angle $A_{of}$ under an immediately preceding variation cycle a-0.

$$A = K_1 \times \frac{N_1 - N_2}{N_1} + 1 \tag{2}$$

$$K_1 = K_2 \times A_{of} + K_3 \tag{3}$$

The rotation speeds $N_1$ and $N_2$ represent rotation speeds during rotation by the unit rotation angle 10°, respectively. The rotation speeds $N_1$ and $N_2$ relate to the set rotation angle width AV from a rotation angle position $A_{OV}$-0 of the variation cycle a-0 corresponding to the rotation angle position $A_{OV}$ of the variation cycle a-1. In other words, the rotation speeds $N_1$ and $N_2$ relate to the set valve close angle width AV when the set valve close angle width AV from the rotation angle position $A_{OV}$ is applied to the variation cycle a-0. The offset angle $A_{of}$ is an angle spacing from the rotation angle position $A_{OV}$-0 of the variation cycle a-0 to the immediately preceding scale pulse of this angle position $A_{OV}$-0. $K_2$ and $K_3$ are numerical constants. The formulas (2) and (3), as described in the later part, are formulas obtained experimentally.

Figure 5C:
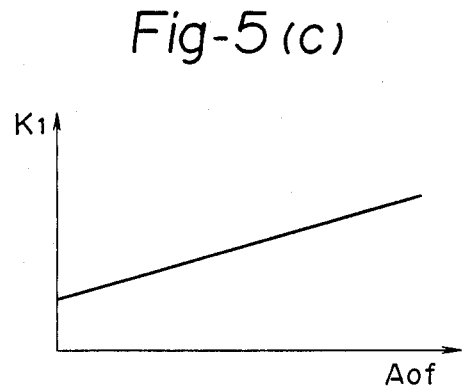

FIG. 5 (A) shows the relationship between the set valve close angle width AV and the actual valve close angle width AV' corresponding to the time width $T = T_{10} \times (AV/10)$ from the rotation angle position $A_{OV}$, under the condition in which the offset angle $A_{of}$ is fixed. The relationship between the set valve close angle width AV and the actual valve close angle with AV' is AV'<AV because of a drop of rotation speed, and a formula AV'=a×AV is obtained. The correcting coefficient A is given by an inverse number 1/a of inclination (a) in the formula AV'=a×AV. The correcting coefficient A is obtained for each case in which the size of variation and the number of rotations are varied. FIG. 5 (B) shows the relationship between the correcting coefficient A and the rotation speed variation value $(N_1 - N_2)/N_1$ of each case in which the size of variation and the number of rotations are varied. The formula (2) is given from FIG. 5 (B). FIG. 5 (C) shows the relationship between a factor $K_1$ and the offset angle $A_{of}$ when the offset angle $A_{of}$ is varied. The formula (3) is given from FIG. 5 (C).

Figure 7:
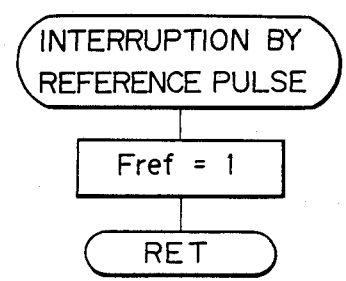
Figure 6C:
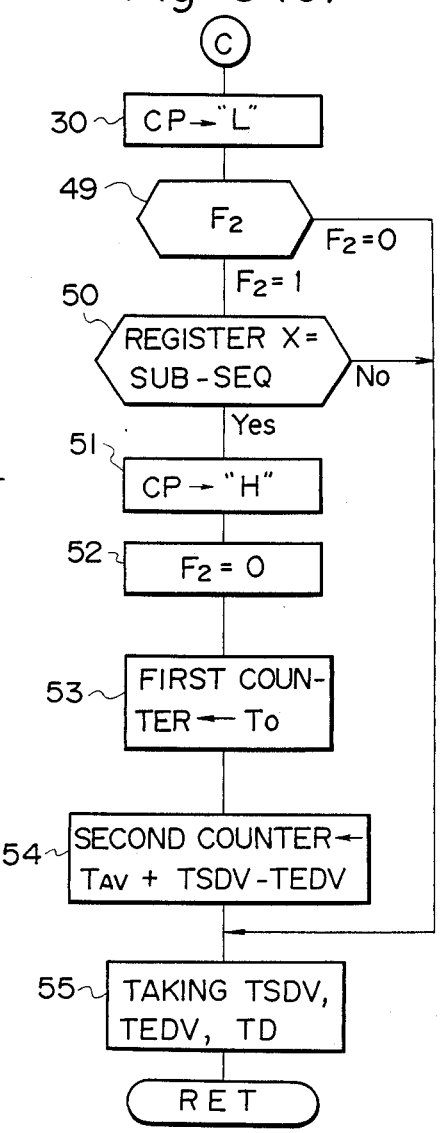
Figure 6A:
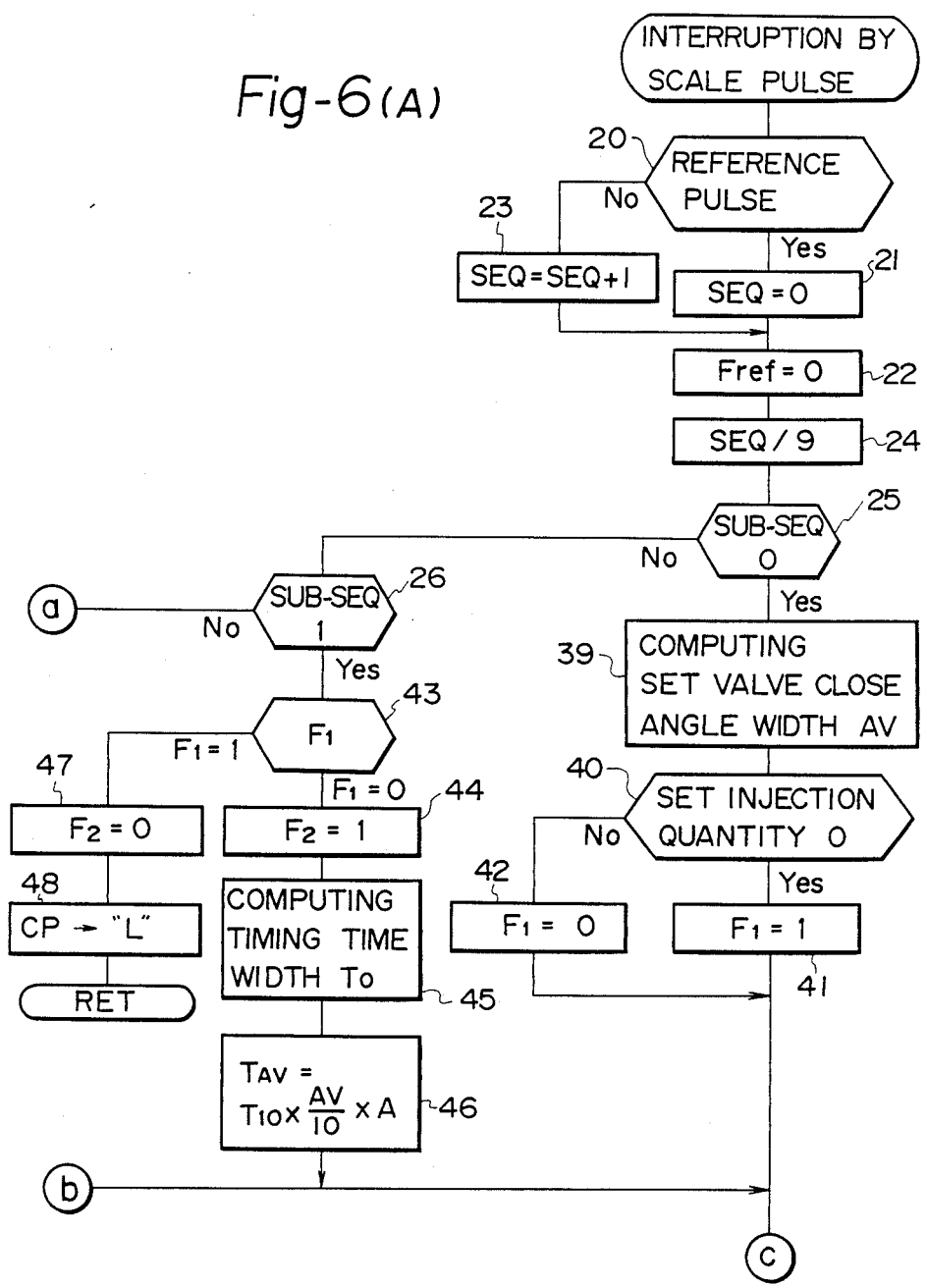
Figure 6B:
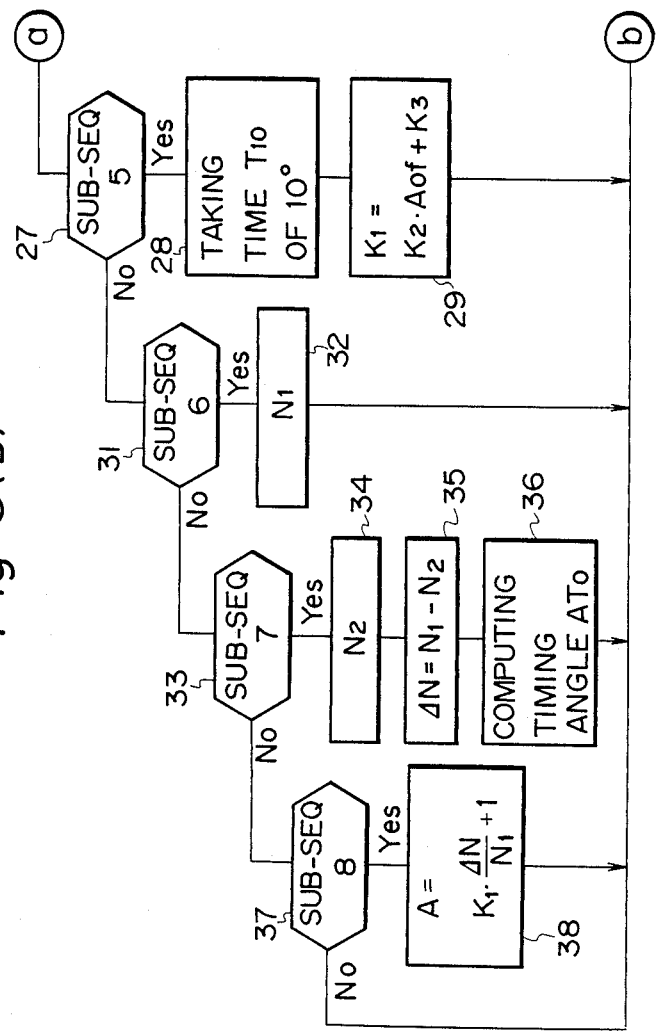

FIG. 6 (A), FIG. 6 (B), FIG. 6 (C) and FIG. 7 show flow diagrams of the microcomputer 5 of FIG. 3. FIG. 6 (A), FIG. 6 (B) and FIG. 6 (C) show an interrupt handling executed whenever receiving each scale pulse of the scale pulse train signal, and FIG. 7 shows an interrupt handling executed whenever receiving each reference pulse of the reference pulse train signal. Terminals a, b and c of FIG. 6 (A) are connected to terminals having the same signs a, b and c of FIG. 6 (B) and FIG. 6 (C).

FIG. 8 is an explanatory drawing for explaining operation of the microcomputer 5. In FIG. 8, a reference sign (a) shows variation cycle, a reference sign (b) shows subsequence number, and a signal (C) shows the scale pulse train signal.

FIG. 9 is an explanatory drawing for explaining the operation of a composition of FIG. 3. In FIG. 9, a signal (a) shows the scale pulse train signal, a signal (b) shows the control pulse CP, a signal (c) shows the trigger pulse TR, a signal (d) shows the timing pulse TP, a signal (e) shows the drive pulse DP, a signal (f) shows the valve close pulse VP, and a signal (g) shows the needle lift pulse NP.

The microcomputer 5 performs an interrupt handling shown in FIG. 6 (A), FIG. 6 (B) and FIG. 6 (C) which is executed whenever each scale pulse of the scale pulse train signal is given, and performs an interrupt handling shown in FIG. 7 when each reference pulse of the reference pulse train signal is given. Also, the microcomputer 5 performs the well-known computation of a set injection quantity and a set injection timing by the main flow (not shown), and gives the set injection quantity and a set injection angle $IT_{ref}$. The set injection angle $IT_{ref}$ is given by an angle width from the top dead center (TDC).

When a scale pulse is given to the microcomputer 5, whether or not a reference pulse was given between the prior scale pulse and the present scale pulse is judged in a step 20. This judgement is done by referring to a reference flag $F_{ref}$ showing the evidence of interruption of a reference pulse. The reference flag $F_{ref}$, as shown in FIG. 7, is set to "1" by interruption of a reference pulse, and is set to "0" in a step 22 of FIG. 6 (A). When there is a reference pulse in the step 22, the sequence number (SEQ) of a scale pulse is reset to "0" in a step 21, and then the processing of the step 22 is performed. If there is no reference pulse in the step 20, the sequence number is incremented +1 in a step 23, and then the processing of the step 22 is performed. After the reference flag $F_{ref}$ set to "0" in the step 22, by dividing the sequence number by the value 9 in the following step 24, a subsequence number (SUB-SEQ) is obtained.

Here, supposing the subsequence number is "5" in the variation cycle a-0 of FIG. 8, the processing of a step 27 of FIG. 6 (B) is performed via steps 25 and 26. In the step 27, the subsequence number is recognized to be "5" in the step 27. Consequently, the processing of step 28 is done. In the step 28, a spacing time $T_{10}$ between a scale pulse with subsequence number "4" in the variation cycle a-0 and a scale pulse with subsequence number "5" is taken in from the pulse spacing measuring circuit 6. The spacing time $T_{10}$ represents a time required for the fuel injection pump to rotate by the unit rotation angle of 10°. In a step 29 following the step 28, the factor $K_1$ of the correcting coefficient A is computed by the formula (3). In this embodiment, where a scale pulse with subsequence number "7" is generated at the top dead center (TDC), a rotation angle position at 70° is the TDC timing. Hereinafter, how to obtain the offset angle $A_{of}$ is described by referring to FIG. 9. First, a result of subtraction is obtained by subtracting the set injection angle $IT_{ref}$ and the injection delay time TD converted to an angle width from the angle 70° which is the TDC timing. Then, the rotation angle position $A_{OV}$ is given by adding the valve close start delay time TSDV converted to an angle width to this result of subtraction. By deducting the rotation angle position 50° of the subsequence number "5" from this rotation angle position $A_{OV}$, the offset angle $A_{of}$ is given. Namely, the calculation formula of the offset angle $A_{of}$ is as follows.

$$A_{of} = \{70 - IT_{ref} - (TD - TSDV)\} - 50$$

The microcomputer 5, after computing the factor $K_1$ in the step 29, performs the processing of a step 30 of FIG. 6 (C), and then returns through the processing of FIG. 6 (C) to the processing of the main flow.

When a scale pulse with subsequence number "6" is given following the scale pulse with subsequence number "5" in the variation cycle a-0 is given, the processing of a step 31 is done via steps 25, 26 and 27. In the step 31, it is recognized that the subsequence number is "6". Consequently, the processing of a step 32 is performed. In the step 32, the spacing time between the scale pulse with subsequence number "5" and the scale pulse with subsequence number "6" in the variation cycle a-0 is taken in from the pulse spacing measuring circuit 6, and based on the taken spacing time, a rotation speed $N_1$ between the scale pulse with subsequence number "5" and the scale pulse with subsequence number "6" is computed. The microcomputer 5, after the step 32, performs the processing of the step 30 of FIG. 6 (C), and through the processing of FIG. 6 (C), returns to the main flow.

When a scale pulse with subsequence number "7" is given following the scale pulse with subsequence number "6", the processing of a step 33 is performed via steps 25, 26, 27 and 31. In the step 33, the subsequence number is recognized as "7". Consequently, the processing of a step 34 is performed. In the step 34, the spacing time between the scale pulse with subsequent number "6" and the scale pulse with subsequence number "7" in the variation cycle a-0 is taken in from the pulse spacing measuring circuit 6, and based on the taken spacing time, the rotation speed $N_2$ between the scale pulse with subsequence number "6" and the scale pulse with subsequence number "7" is computed. In a step 35 following the step 34, the difference between the rotation speeds $N_1$ and $N_2$, $\Delta N = N_1 - N_2$ is computed. In the step 36 following the step 35, a timing angle $AT_O$ is computed. The timing angle $AT_O$ shows a rotation angle position at which the drive pulse DP is generated. The timing angle $AT_O$ is given by subtracting the set injection angle $IT_{ref}$ and the injection delay time TD converted to an angle width from the angle 70° which is the TDC timing. Namely, the calculation formula of the fiming angle $AT_O$ is as follows.

$$AT_O = 70 - (IT_{ref} + TD)$$

The microcomputer 5 drives the timing angle $AT_O$ by the unit rotation angle 10°, stores a value (quotient−1) obtained by subtracting 1 from the result of division into an inner register X, and stores the remainder of the result of division into an inner register Y. FIG. 9 shows a case in which the timing angle $AT_O$ is 48. In the case of FIG. 9, a value stored in the inner register X is 3, and a value stored in the inner register Y is 8. The microcomputer 5, after the computation of the timing angle $AT_O$ of the step 36, performs the processing of the step 30 of FIG. 6 (C), and then returns through the processing of FIG. 6 (C) to the main flow.

When a scale pulse with subsequence number "8" of the variation cycle a-1 is given following the scale pulse with the subsequence number "7" of the variation cycle a-0, the processing of a step 37 is performed via the steps 25, 26, 27, 31 and 33. In the step 37, the subsequence number is recognized to be "8". Consequently, the processing of a step 38 is performed. In the step 38, computation of the correcting coefficient A is performed by substituting the factor $K_1$ of the step 29, the speed difference $\Delta N$ of the step 35 and the rotation speed $N_1$ of the step 32 for the formula (2). The microcomputer 5, after the step 38, enters the step 30 of FIG. 6 (C), and then returns through the processing of FIG. 6 (C) to the main flow.

When a scale pulse with subsequence number "0" is given following the scale pulse with subsequence number "8" in the variation cycle a-1, the subsequence number is recognized to be "0" in the step 25. Consequently the processing of a step 39 is performed. In the step 39, the set valve close angle width AV corresponding to the set injection quantity is computed. In a step 40 following the step 39, a judgement whether or not the set injection quantity is zero is done. If the set injection quantity is zero, a no-injection flag $F_1$ is set to "1" in a step 41, or if the set injection quantity is not zero, the no-injection flag $F_1$ is set to "0" in a step 42. The microcomputer 5, after the processing of the no-injection flag $F_1$, enters the processing of the step 30, and then returns to the processing of the main flow through the processing of FIG. 6 (C).

When a scale pulse with subsequence number "1" is given following the scale pulse with subsequence number "0" in the variation cycle a-1, the subsequence number is recognized to be "1" in the step 26. Consequently, the processing of a step 43 is performed. In the step 43, judgement of the no-injection flag $F_1$ is done. If the no-injection flag $F_1$ is "0", namely if the set injection quantity is not zero, a drive flag $F_1$ is set to "1" in a step 44. In a step 45 following the step 44, the timing time width $T_0$ to be set to the first counter 14 is computed. The timing time with $T_0$ is given by converting the angle width stored in the inner register Y into a time width. In the case of FIG. 9, the timing time width $T_0$ is a value of a time-converted angle width of 8°. In a step 46 following the computation of the timing time width $T_0$ of the step 45, the set valve close angle width AV is converted to a time width $T_{AV}$ by substituting the spacing time $T_{10}$ of the step 28, the correcting coefficient A of the step 38 and the set valve close angle width AV of the step 39 for the formula (1). The microcomputer 5, after the processing of the step 46, enters the processing of the step 30 of FIG. 6 (C), and then returns through the processing of FIG. 6 (C) to the processing of the main flow. In the meantime, in the case in which the no-injection flag $F_1$ is "1", namely if the set injection quantity is zero, the drive flag $F_2$ is set to "0" in a step 47. In the step 48 following the processing of the step 47, the control pulse CP is set to the Low level. The microcomputer 5, after performing the processing of the step 48, directly returns to the main flow, without entering the flow of FIG. 6 (C).

The microcomputer 5, when scale pulses with subsequence numbers "2". "3" and "4" are given, enters the processing of the step 30 of FIG. 6 (C) via the steps 25, 26, 27, 31, 33 and 37, and then returns through the processing of FIG. 6 (C) to the processing of the main flow.

In the step 30 of FIG. 6 (C), the control pulse CP is set to the Low level. In a step 49 following the step 30, the status of the drive flag $F_2$ is judged. When the drive flag $F_2$ is "1", it indicates that injection is not performed yet under the status other than the no-injection status. When the drive flag $F_2$ is "0", it indicates that injection has already been done, or that the status is no-injection. When the drive flag $F_2$ is "1", the processing of a step 50 is performed, or when the drive flag $F_2$ is "0", the processing of a step 55 is performed. In the step 50, a judgement whether or not the contents of the inner register X agree with the subsequence number of the current scale pulse is done. When they agree, the processing of a step 51 is performed, or when they do not agree, the processing of the step 55 is performed. In the case of FIG. 9, since a value "3" is stored in the inner register X, the processing of the step 51 is performed by interruption of a scale pulse with subsequence number "3". In the step 51, the control pulse CP is set to the High level. In a step 52 following the processing of the step 51, the drive flag $F_2$ is set to "0". In a step 53 following the step 52, the timing time width $T_0$ obtained in the step 45 is set to the first counter 14. In a step 54 following the step 53, the valve closing time width $T_1$ is set to the second counter 15. The valve close time width $T_1$ is given by the following formula, by using the time width $T_{AV}$ obtained in the step 46, the valve close start delay time TSDV and valve close end delay time TEDV of the electromagnetic valve 7.

$$T_1 = T_{AV} + TSDV = TEDV$$

In the step 55 following the step 54, the valve close start delay time TSDV and valve close end delay time TEDV of the response delay measuring circuit 10, and the injection delay time TD of the injection delay measuring circuit 12 are taken into the microcomputer 5. The microcomputer 5, after the processing of the step 55, returns to the processing of the main flow.

The control pulse CP set to the High level in the step 51 is returned to the Low level when the next pulse is given. Namely, in the case of FIG. 8, the control pulse CP is returned to the Low level in the step 30 of FIG. 5 (B) when there is an interruption of a scale pulse with subsequence number "4" following a scale pulse with subsequence number "3". The rising edge and falling edge of the control pulse CP is delayed by the delay in processing, as shown in FIG. 9. Therefore, when a scale pulse with subsequence number "4" is generated, the AND circuit 13 outputs the trigger pulse TR. By this, the first counter 14 outputs a timing pulse TP with timing time width $T_0$, and the second counter 15, in response to the falling of the timing pulse TP, outputs the drive pulse DP with valve close time width $T_1$. The drive circuit 8, while the drive pulse DP is given, gives the drive signal DS to the electromagnetic valve 7, and thereby the electromagnetic valve 7 closes. As the time width $T_{AV}$ of the set valve close angle AV corresponding to the set injection quantity is corrected by the correcting coefficient A, an error between the actual valve close angle width corresponding to the valve close time width $T_1$ and the set valve close angle width AV which gives the set injection quantity is corrected, and thus the set injection quantity is given irrespective of the rotation speed variation of the engine.

In the above-mentioned embodiments, explanations were given on the fuel injection control of a diesel engine. However, the present invention is extensively applicable to cases for converting information of a rotation angle width to that of a time width required for a rotary machine to rotate by the rotation angle width from a given set rotation angle position.

As described in detail, according to the present invention, an error between the rotation angle width given as information and the actual rotation angle width corresponding to a time width which this rotation angle width is time-converted can be corrected by a correcting coefficient given based on the rotation speed variation and the set rotation angle position of a rotary machine, irrespective of the rotation speed variation of the rotary machine.

From the foregoing it will now be apparent that a new and improved invention has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. An apparatus for converting a set rotation angle width related to a rotary machine, of which rotation speed varies cyclically, into a time width required for said rotary machine to rotate by said set rotation angle width from a given rotation angle position comprising;
   scale pulse train signal generating means for generating a scale pulse train signal having a scale pulse given whenever said rotary machine rotates a predetermined unit rotation angle;
   reference pulse train signal generating means for generating a reference pulse train signal having a reference pulse for identifying each scale pulse of said scale pulse train signal;
   converting means, responsive to said scale pulse train signal, said reference pulse train signal and said set rotation angle width, for detecting a spacing time of a specified scale pulse, based on identification by said reference pulse train signal, of each scale pulse of said scale pulse train signal, for converting said set rotation angle width to a time width by using the detected spacing time and said unit rotation angle, and for giving the converted time width;
   operating means, responsive to said scale pulse train signal and said reference pulse train signal, for detecting, based on said identification by said reference pulse train signal of each scale pulse of said scale pulse train signal, each respective spacing time of a plurality of scale pulses predetermined in relation to said given rotation angle position and said set rotation angle width, computing a rotation speed variation value of said rotary machine based on each detected spacing time, and for giving the computed rotation speed variation value; and
   Correcting means, responsive to the time width from said converting means, the rotation speed variation value from said operating means and said given rotation angle position, for computing, based on said rotation speed variation value and said given rotation angle position, a correcting coefficient for correcting an error between said set rotation angle width and an actual rotation angle width corresponding to said time width, correcting said time width by using said correcting coefficient, and for giving the corrected time width.

2. An apparatus according to claim 1, wherein said rotary machine is a fuel injection pump driven by an internal-combustion engine.

3. An apparatus according to claim 1, wherein said spacing time in said converting means is a spacing time of a scale pulse adjacent to a rotation angle position, corresponding to said given rotation angle position, in an immediately preceding variation cycle of a variation cycle of said rotary machine corresponding to said given rotation angle position; and
   wherein said converting means converts said set rotation angle width to said time width by means of a following calculation formula:

$$T = T_{10} \times (AV/\theta_s),$$

where, T is said time width, $T_{10}$ is said spacing time, AV is said set rotation angle width, and $\theta_s$ is said unit rotation angle.

4. An apparatus according to claim 1, wherein said plurality of scale pulses in said operating means are two scale pulses related to said set rotation angle width from a rotation angle position, corresponding to said given rotation angle position, in a variation cycle immediately preceding a variation cycle of said rotary machine corresponding to said given rotation angle position; and
   wherein said operating means computes said rotation speed variation value by means of a following calculation formula, $$N = (N_1 - N_2)/N_1$$

where, N is said rotation speed variation value, $N_1$ is a first unit rotation speed based on a spacing time of the former scale pulse of said two scale pulses, and $N_2$ is a second unit rotation speed based on a spacing time of the latter scale pulse of said two scale pulses.

5. An apparatus according to claim 1, wherein said correcting means gives said correcting coefficient by means of the following calculation formula, $$A = K_1 \times N + 1$$

$$K_1 = K_2 A_{of} + K_3$$

where, A is said correcting coefficient, $K_1$ is a factor, N is said speed variation value, $K_2$ and $K_3$ are numerical constants, and $A_{of}$ is an angle spacing from a rotation angle position corresponding to said given rotation angle position to an immediately preceding scale pulse in a variation cycle immediately preceding a variation cycle of said rotary machine corresponding to said given rotation angle position; and wherein said correcting means give said corrected time width by meals of a following calculation formula, $$T_{AV} = T \times A$$

where, $T_{AV}$ is said corrected time width, and T is said time width of said converting means.

6. An apparatus for converting a set rotation angle width related to a rotary machine, of which rotation speed varies cyclically, into a time width required for said rotary machine to rotate by said set rotation angle width from a given rotation angle position comprising;

scale pulse train signal generating means for generating a scale pulse train signal having a scale pulse given whenever said rotary machine rotates a predetermined unit rotation angle;

reference pulse train signal generating means for generating a reference pulse train signal having a reference pulse for identifying each scale pulse of said scale pulse train signal;

identifying means for identifying each scale pulse of said scale pulse train signal by means of a reference pulse of said reference pulse train signal;

detecting means, responsive to said scale pulse train signal and a result of identifying of said idenfitying means, for detecting, when a first scale pulse of said scale pulse train signal is given, a spacing time of a predetermined scale pulse of said scale pulse train signal;

first speed computing means, responsive to said scale pulse train signal and the result of identifying of said identifying means, for detecting, when a second scale pulse of said scale pulse train signal is given, a spacing time of a scale pulse of said scale pulse train signal predetermined in relation to said given rotation angle position and said set rotation angle width, and for determining a first unit rotation speed based on the spacing time detected;

a second speed computing means, responsive to said scale pulse train signal and the result of identifying of said identifying means, for detecting, when a third scale pulse of said scale pulse is given, a spacing time of another scale pulse of said scale pulse train signal predetermined in relation to said given rotation angle position and said set rotation angle width, and for determining a second unit rotation speed based on the spacing time detected;

variation value computing means, responsive to the first unit rotation speed of said first speed computing means and the second unit rotation speed of said second speed computing means, for determining a rotation speed variation value of said rotary machine by using said first and second unit rotation speeds;

correcting coefficient computing means, responsive to said scale pulse train signal, the result of identifying of said indentifying means, the rotation speed variation value of said variation value computing means and said given rotation angle position, for computing, when a fourth scale pulse of said scale pulse train signal is given, a correcting coefficient based on said rotation speed variation value and said given rotation angle position; and correcting means, responsive to the spacing time of said detecting means, said unit rotation angle, said set rotation angle width, and said correcting coefficient of said correcting coefficient computing means, for outputting a corrected time width by using said spacing time, said unit rotation angle, said set rotation angle width and said correcting coefficient.

7. An apparatus according to claim 6, wherein said rotary machine is a fuel injection pump driven by an internal-combustion engine.

8. An apparatus according to claim 6, wherein said variation value computing means compute said rotation speed variation value by means of a following calculation formula, $$N = (N_1 - N_2)/N_1,$$

where, N is said rotation speed variation value, $N_1$ is said first unit rotation speed, and $N_2$ is said second unit rotation speed.

9. An apparatus according to claim 6, wherein said correcting coefficient computing means give said correcting coefficient by means of a following calculation formula, $$A = (K_2 A_{of} + K_3) \times N + 1$$

where, A is said correcting coefficient, N is said speed variation value, $K_2$ and $K_3$ are numerical costants, and $A_{of}$ is an angle spacing from a rotation angle position corresponding to said given rotation angle position to an immediately preceding scale pulse.

10. An apparatus according to claim 6, wherein said correcting means give said corrected time width by means of a following calculation formula, $$T_{AV} = T_{10} \times (AV/\theta_s) \times A,$$

where, $T_{AV}$ is said corrected time width, $T_{10}$ is the spacing time of said detecting means, AV is said set rotation angle width, $\theta_s$ is said unit rotation angle, and A is said correcting coefficient.

11. A method for converting a set rotation angle width related to a rotary machine, of which roration speed varies cyclically, into a time width required for said rotary machine to rotate by said set rotation angle width from a given rotation angle position, comprising the steps of;

receiving a scale pulse train signal having a scale pulse given whenever said rotary machine rotated by a predetermined unit rotation angle and a reference pulse train signal having a reference pulse for indentifying each scale pulse of said scale pulse train signal;

identifying each scale pulse of said scale pulse train signal by means of the reference pulse of said reference pulse train signal;

detecting, when a first scale pulse of said scale pulse train signal is given, a spacing time of a predetermined scale pulse of said scale pulse train signal by responding to said scale pulse signal and said identification;

detecting, when a second scale pulse of said scale pulse train signal is given, a spacing time of a scale pulse of said scale pulse train signal predetermined in relation to said given rotation angle position and said set rotation angle width, by responding to said scale pulse train signal and said identification, and determining a first unit rotation speed based on the spacing time detected;

detecting, when a third scale pulse of said pulse train signal is given, a spacing time of another scale pulse of said scale pulse train signal predetermined in relation to said given rotation angle position and said set rotation angle width, by responding to said scale pulse train signal and said identification, and determining a second unit rotation speed based on the spacing time detected;

computing a rotation speed variation value of said rotary machine by responding to said first and second unit rotation speeds and by using said first and second unit rotation speeds;

computing, when a fourth scale pulse of said scale pulse train signal is given, a correcting coefficient, by responding to said scale pulse train signal, said identification, said rotation speed variation value and said given rotation angle position, based on said rotation speed variation value and said given rotation angle position; and outputting a corrected time width, by responding to said spacing time, said unit rotation angle, said set rotation angle width and said correcting coefficient, by using said spacing time, said unit rotation angle, said set rotation angle width and said correcting coefficient.

12. An apparatus according to claim 11, wherein said rotary machine is a fuel injection pump driven by an internal-combustion engine.

13. An apparatus according to claim 11, wherein said rotation speed variation value is computed by means of a following calculation formula, $$N=(N_1-N_2)/N_1,$$

where, N is said rotation speed variation value, $N_1$ is said first unit rotation speed, and $N_2$ is said second unit rotation speed.

14. An apparatus according to claim 11, wherein said correcting coefficient is computed by means of the following calculation formula, $$A=(K_2 A_{of}+K_3)\times N+1$$

where, A is said correcting coefficient, N is said speed variation value, $K_2$ and $K_3$ are numerical constants, and $A_{of}$ is an angle spacing from a rotation angle position corresponding to said given rotation angle position to an immediately preceding scale pulse.

15. An apparatus according to claim 11, wherein said corrected time width is computed by means of the following calculation formula, $$T_{AV}=T_{10}\times(AV/\theta_s)\times A$$

where, $T_{AV}$ is said corrected time width, $T_{10}$ is said time width detected when said first scale pulse is given, AV is said set rotation angle width, $\theta_s$ is said unit rotation angle, and A is said correcting coefficient.

* * * * *